United States Patent [19]

Niedospial

[11] Patent Number: 5,004,176

[45] Date of Patent: Apr. 2, 1991

[54] FILM CASSETTE

[75] Inventor: John J. Niedospial, Rochester, N.Y.

[73] Assignee: Eastman Kodak Company, Rochester, N.Y.

[21] Appl. No.: 490,232

[22] Filed: Mar. 8, 1990

[51] Int. Cl.$^5$ .................... G03B 1/04; G03B 17/26
[52] U.S. Cl. ................. 242/71.1; 242/71.8; 354/275
[58] Field of Search ............. 354/275, 339, 340, 212, 354/21; 242/71, 71.1, 71.8, 71.9

[56] References Cited

U.S. PATENT DOCUMENTS

| 3,684,206 | 8/1972 | Edwards | 354/275 X |
| 4,860,037 | 8/1989 | Harvey | 354/275 X |
| 4,883,235 | 11/1989 | Nideospial et al. | 242/71.1 |
| 4,883,326 | 11/1989 | Niedospial et al. | 242/71.9 X |
| 4,899,948 | 2/1990 | Niedospial et al. | 242/71.8 X |

Primary Examiner—William A. Cuchlinski, Jr.
Assistant Examiner—Joseph A. Rhoa
Attorney, Agent, or Firm—Roger A. Fields

[57] ABSTRACT

In a film cassette, a spool core is supported for rotation in an unwinding direction to thrust a leader section of a film roll coiled about the spool core to the exterior of the cassette and in a winding direction to return the leader to the interior of the cassette. A pair of flanges are arranged in spaced relation along the spool core to radially confine the leader. The flanges are adapted to be flexed apart to permit the leader to readily escape the confinement of the flanges when the spool core is rotated in the unwinding direction. According to the invention, the leader has respective edge portions for flexing the flanges apart in succession when the spool core is rotated in the unwinding direction, whereby the leader can more easily overcome any resistance the flanges may present to movement of the leader outwardly of the flanges.

8 Claims, 10 Drawing Sheets

FILM CASSETTE

CROSS-REFERENCE TO RELATED APPLICATIONS

Reference is made to commonly assigned copending applications Ser. No. 07/320,440, entitled FILM CASSETTE, and filed Mar. 8, 1989 in the name of John J. Niedospial; Ser. No. 07/415,750, entitled FILM CASSETTE, and filed Sept. 27, 1989 in the name of John J. Niedospial; and Ser. No. 07/464,264 entitled FILM CASSETTE, and filed Jan. 9, 1990 in the names of Edward H. Dowling, et al.

BACKGROUND OF THE INVENTION

1. Field of the Invention

The invention relates generally to the field of photography, and Particularly to a film cassette containing roll film. More specifically, the invention relates to a film cassette that is capable of automatically advancing a non-protruding film leader to the exterior of the cassette shell responsive to unwinding rotation of a film spool within the shell. 2. Description of the Prior Art In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2¼ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely inside the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall at a location inwardly of a non-light tight film passageway to the outside of the cassette shell. During initial unwinding rotation of the film spool, the leading end of the filmstrip is advanced along the shell wall until it reaches an inner entrance to the film passageway. Then, it is advanced into and through the film passageway to the outside of the cassette shell. The passageway has a width that is less than the width of the filmstrip, thus resulting in the filmstrip being transversely bowed as it is uncoiled from the film spool, and thereby facilitating movement of the film edges under the circumferential lips of the flanges. However, severe transverse bowing of the filmstrip in order to move its longitudinal edges under the circumferential lips of the flanges may damage the filmstrip.

Like the type of film cassette disclosed in U.S. Pat. No. 4,423,923, commonly assigned U.S. Pat. Nos. 4,834,306 granted May 30, 1989, 4,848,693, granted July 18, 1989, and 4,860,037, granted Aug. 22, 1989, each disclose a film cassette that is capable of automatically advancing a non-protruding film leader to the outside of the cassette shell in response to rotation of the film spool in the unwinding direction. Specifically, there is disclosed a film cassette wherein a film roll is wound on a spool between a pair of coaxially spaced, independently rotatable flanges. The two flanges have respective circumferential annular lips which prevent the outermost convolution of the film roll, including its leading end, from clock-springing into contact with the interior wall of the cassette shell. When the spool is initially rotated in the unwinding direction, the flanges may momentarily remain stationary and the film roll, since its inner end is secured to the spool, tends to expand radially to ensure a firm non-slipping relation between the outermost convolution and the annular lips. Once the non-slipping relation exists, continued rotation of the spool will similarly rotate the flanges. This allows stationary internal spreaders to deflect successive portions of the annular lips to an axial dimension exceeding the film width, in turn allowing the leading end and successive sections of the film roll to be freed from the radial confinement of the annular lips and to be advanced into and through a light tight film passageway to the outside of the cassette shell. A stripper-guide located adjacent an inner entrance to the film passageway diverts the leading end of the film roll into the passageway by being received between the leading end and the next-inward convolution of the film roll responsive to unwinding rotation of the spool.

The Cross-Referenced Applications

Cross-referenced applications Ser. Nos. 07/320,440, 07/415,750, and 07/464,264 each disclose a film cassette wherein a film roll whose outermost convolution is a film leader is coiled about a spool rotatable within the cassette shell, a pair of flexible independently rotatable flanges are coaxially arranged on the spool to radially confine the film leader within respective skirted peripheries of the flanges to prevent the leader from substantially contacting an interior wall of the cassette shell, and a film stripper-guide projecting from the interior wall is received between a leading end of the film leader and the next-inward convolution of the film roll to free the leader from the flanges and guide the leader through a light tight film passageway to the exterior of the cassette shell responsive to rotation of the spool in a film unwinding direction. Specifically, the stripper-guide frees the film leader from the flexible flanges by inducing the leader to simultaneously flex the two flanges farther apart at their skirted peripheries during unwinding rotation of the spool. Moreover, the film leader and at least one of the flanges include mutual engagement means for maintaining the leading end of the leader spaced at least a minimum radial distance from the next-inward convolution of the film roll sufficient to locate the leading end within range of the stripper-guide, to ensure that the leading end will be advanced over the stripper-guide responsive to rotation of the spool in the film unwinding direction.

SUMMARY OF THE INVENTION

It has been found that by allowing the film leader to flex the respective flanges farther apart at their skirted peripheries one after the other, rather than simultaneously as in the cross-referenced applications, when the spool is rotated in the unwinding direction, the leader can more easily overcome any resistance the flanges may present to movement of the leader outwardly of the skirted peripheries.

Thus, the invention may be summarized as follows:

A film cassette comprising a spool core supported for rotation in an unwinding direction to thrust a leader section of a film roll coiled about the spool core to the exterior of the cassette and in a winding direction to return the leader to the interior of the cassette, and a pair of flanges arranged in spaced relation along the spool core to radially confine the leader and adapted to be flexed apart to permit the leader to readily escape the confinement of the flanges when the spool core is rotated in the unwinding direction, is characterized in that the leader has respective edge portions for flexing the flanges apart in succession, i.e. one after the other, when the spool core is rotated in the unwinding direction, whereby the leader can more easily overcome any resistance the flanges may present to movement of the leader outwardly of the flanges.

DETAILED DESCRIPTION OF THE PREFERRED EMBODIMENT

The invention is disclosed as being embodied preferably in a 35mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
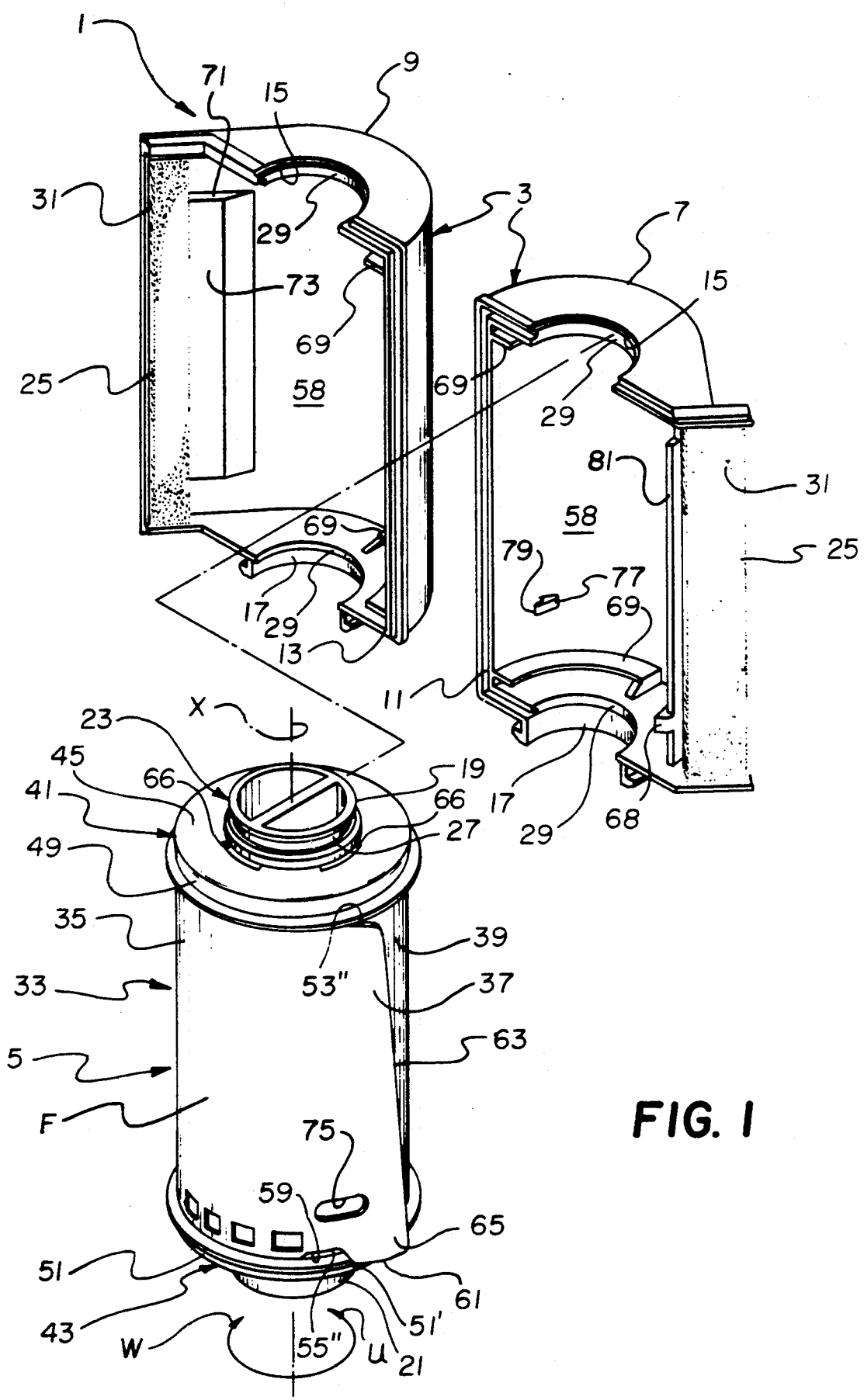
FIG. 1 is an exploded perspective view of a film cassette according to a preferred embodiment of the invention.
Figure 2:
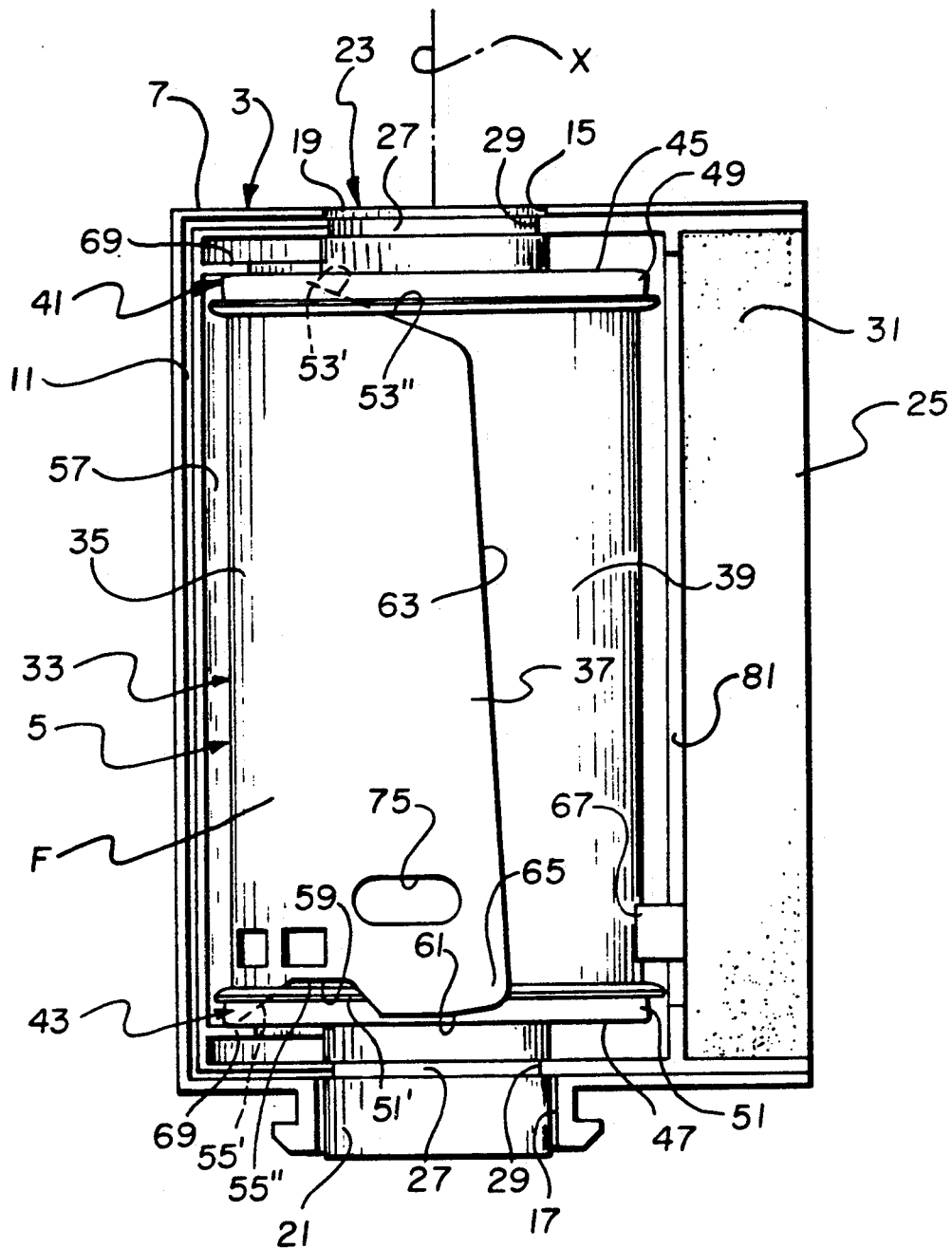
FIG. 2 is an elevation view of the film cassette, illustrating the cassette shell open to reveal a film roll coiled about a film spool.
Figure 12:
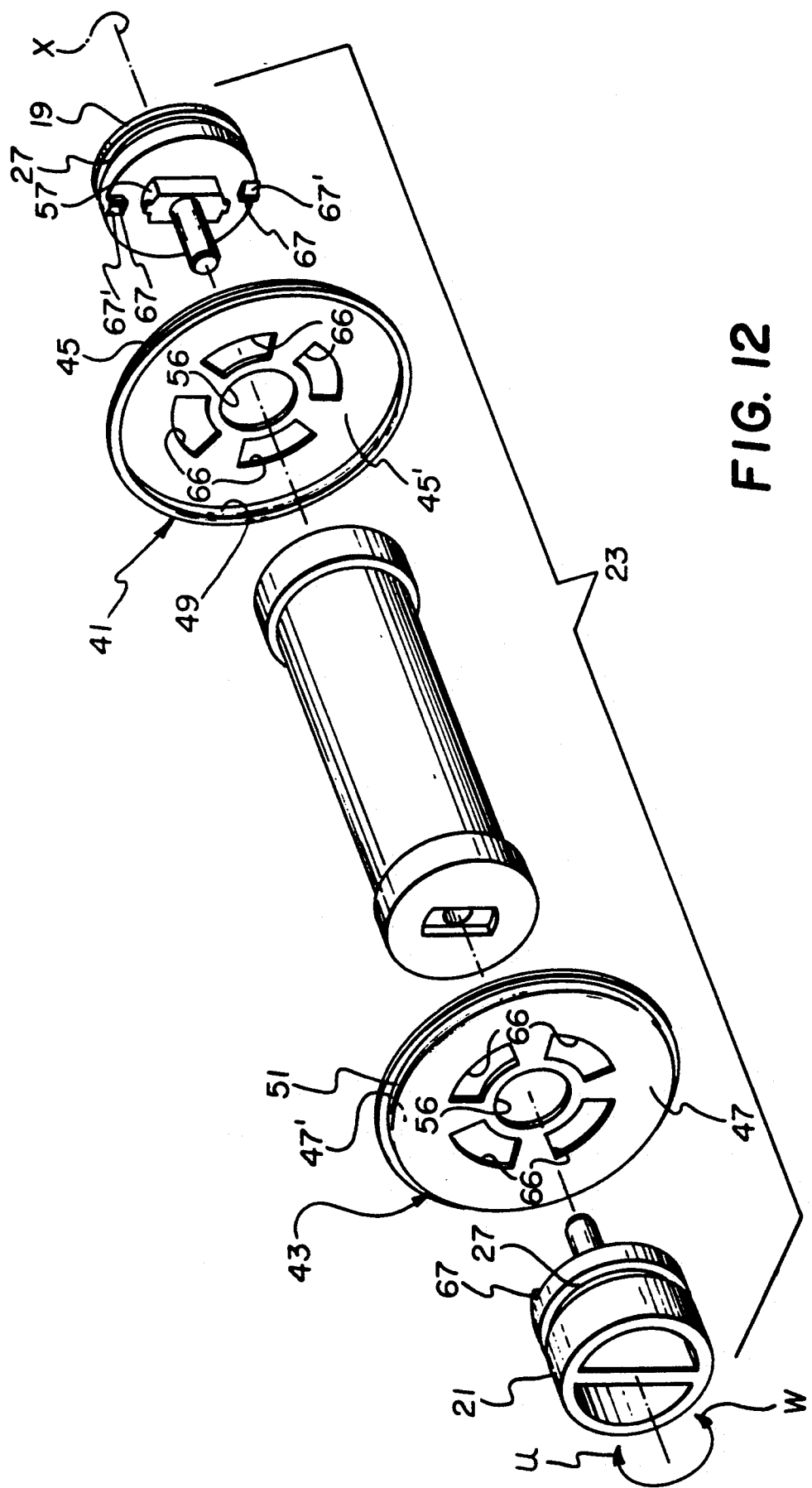
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
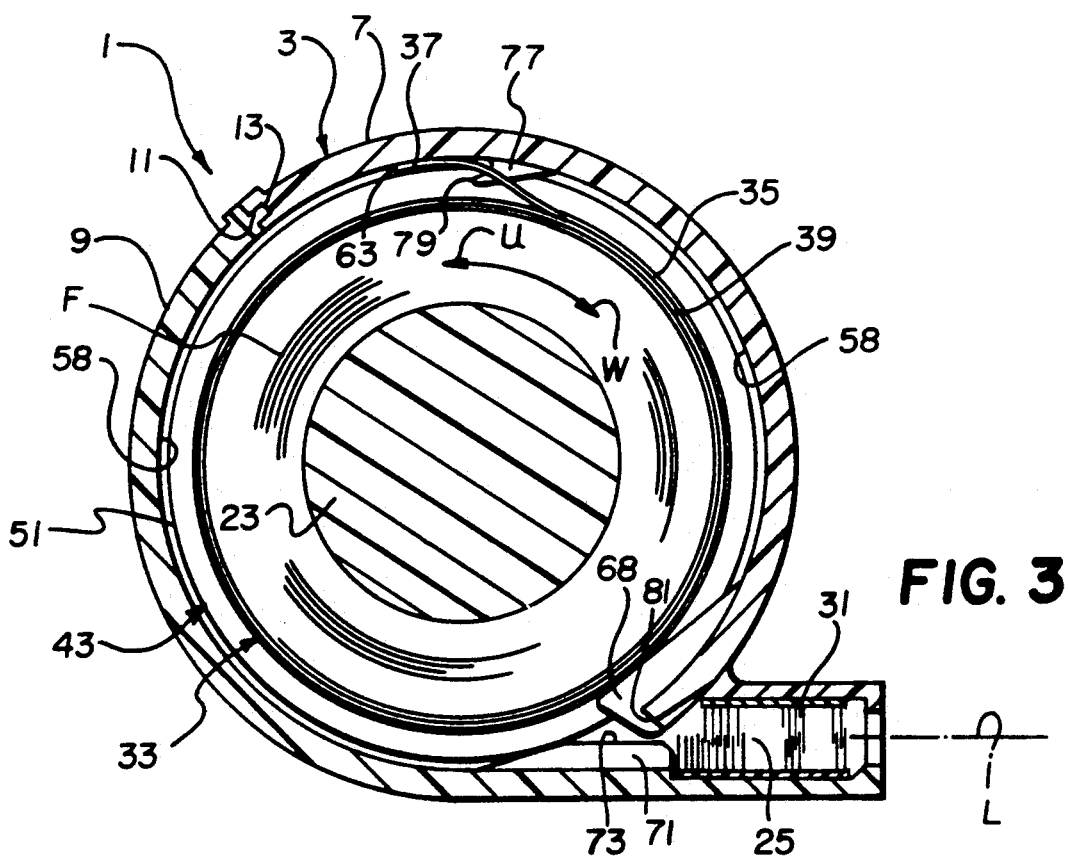
FIG. 3 is an end view partly in section of the cassette shell, the film roll and the film spool, illustrating the manner in which the film roll is originally stored on the film spool.
Figure 5:
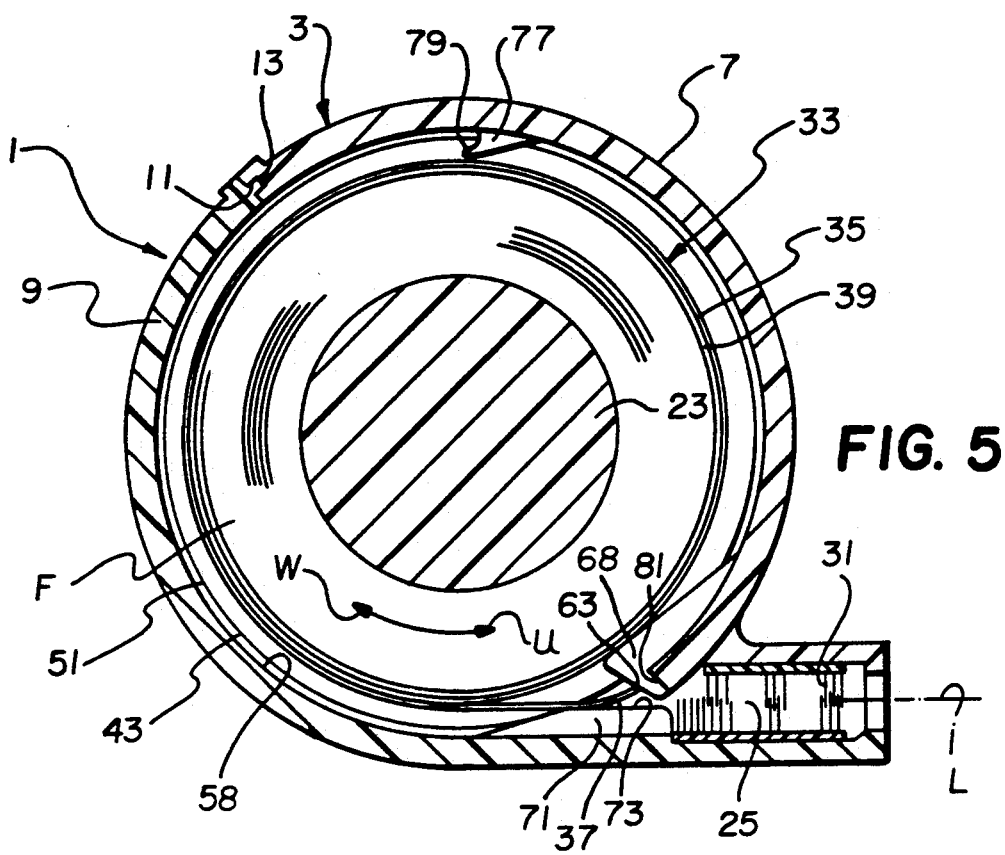
Figure 13:
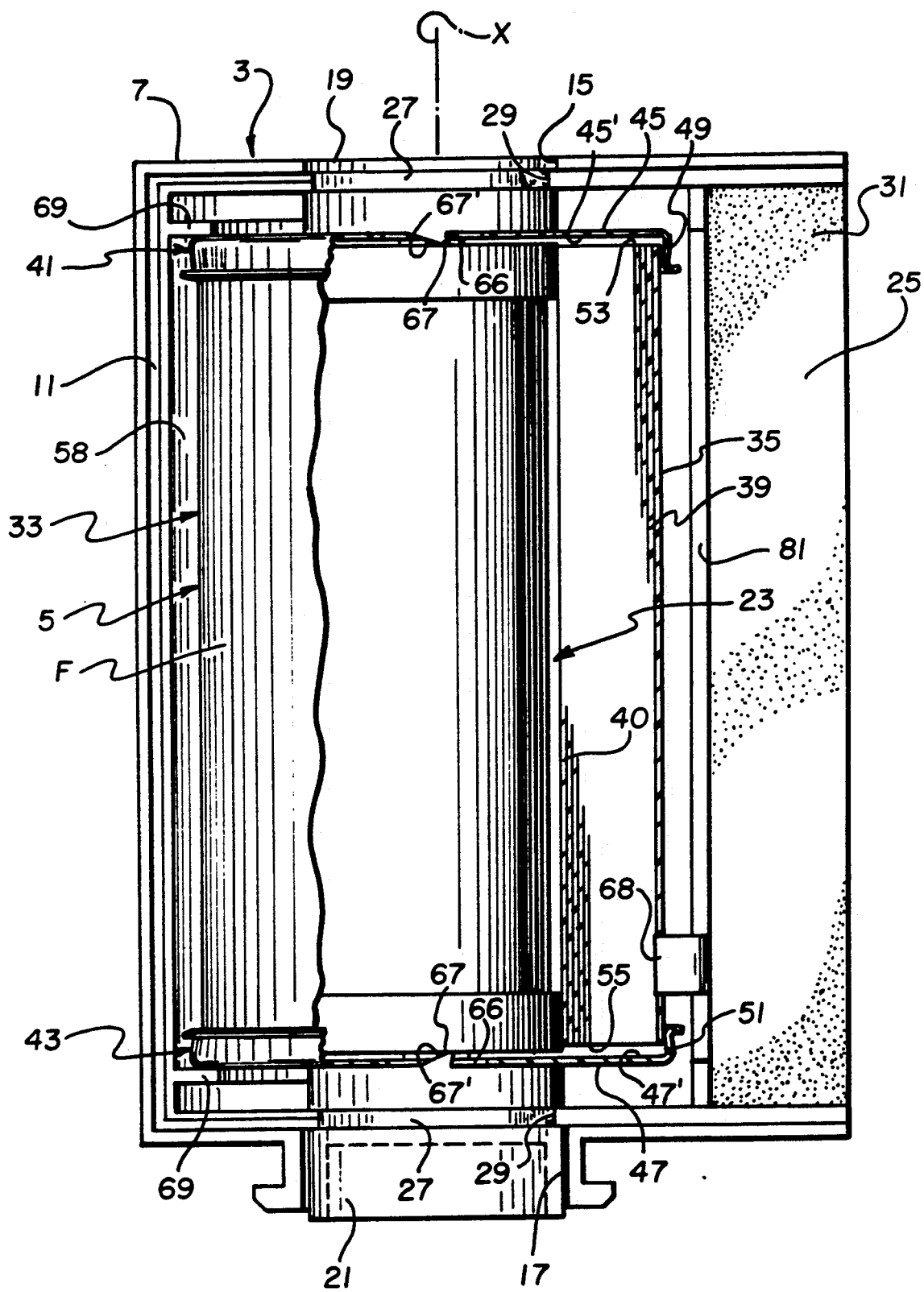
FIG. 13 is an elevation view partly in section of the film roll and the film spool, illustrating the manner in which one of a pair of film confining flanges of the spool may be fixed to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 9:
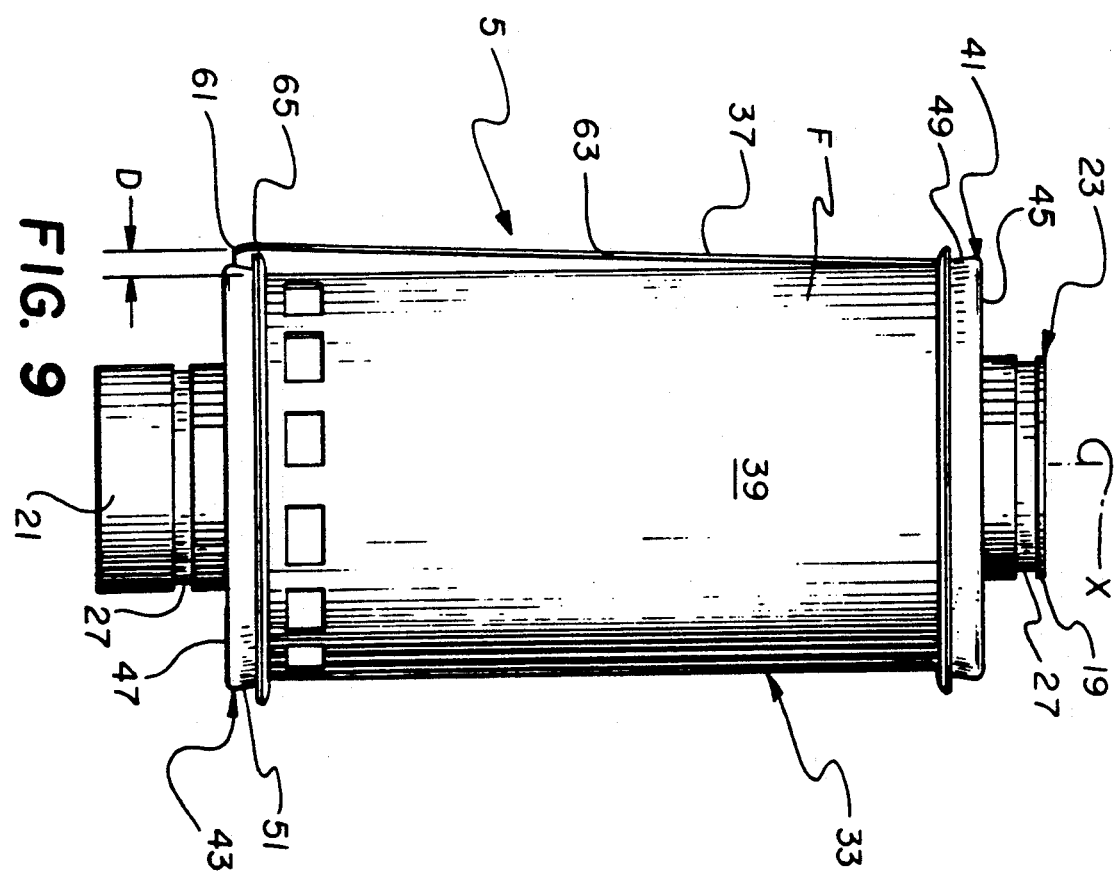

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential recesses 57 are provided in the spool core 23 for supporting the flanges 41 and 43 at their disks 45 and 47 to permit the flanges to be independently rotated about the axis X. The two recesses 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. An elongate lip-receiving notch or cut-out 59 is cut in the film leader (outermost convolution) 35 along its longitudinal edge 55, relatively close to its leading end 37, to receive a peripheral section 51' of the annular lip 51. This allows a relatively short edge portion 61 of the leader's longitudinal edge 55 which connects the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the leader's longitudinal edge 53 to the leader's longitudinal edge 55 to form a forward-most tip or tab 65 of the film leader 35 which, like the edge portion 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
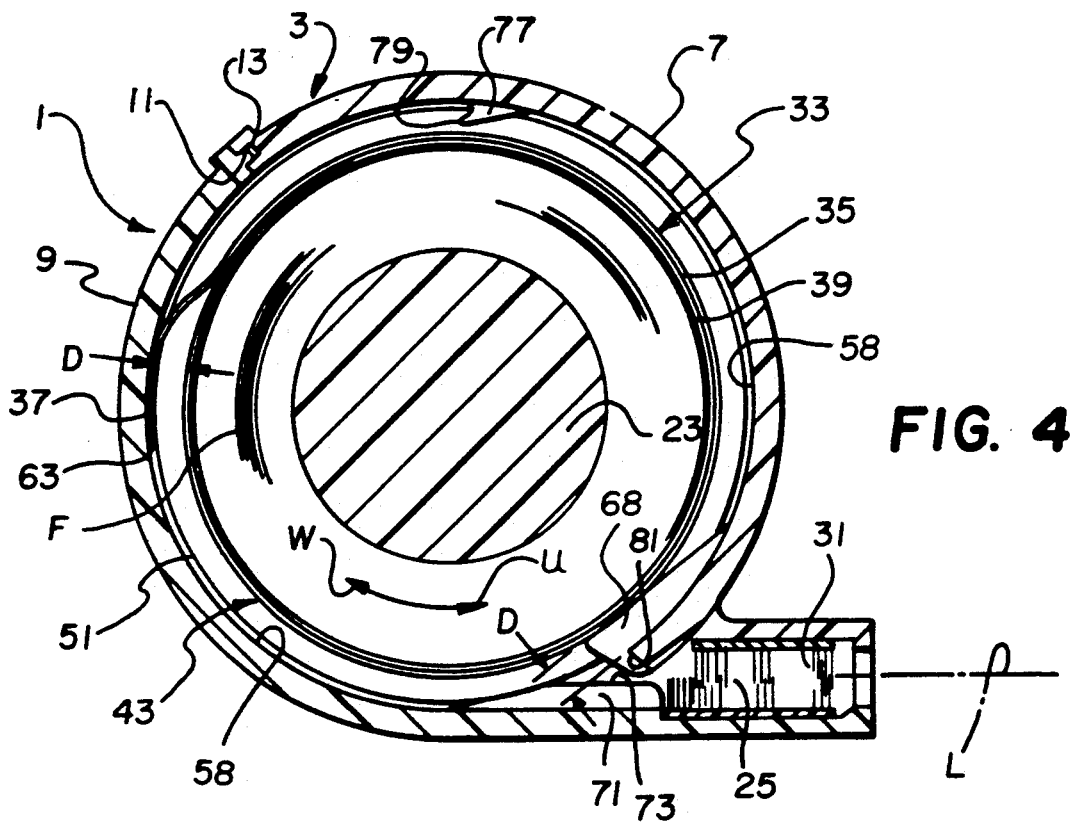
FIGS. 4, 5, 6 and 7 are end views similar to FIG. 3, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

When the leading end 37 of the film leader (outermost convolution) 35 is initially advanced over the stripper-guide 68 responsive to rotation of the spool core 23 in the unwinding direction U, an inclined edge portion 53' of the leader's longitudinal edge 53 starts to locally flex the flange 41 farther apart from the flange 43. See FIG. 10. Since only the flange 41 is flexed at this time, it co-operates to maintain the notch 59 in the leader's longitudinal edge 55 at the lip section 51' of the annular lip 51. The notch 59, in turn, allows the film leader 35 to move outwardly of the flange 43 without that flange having to be flexed. See FIG. 10. The notch 59 is sufficiently spaced from the leader's forward edge 63 to allow at least the forward-most tip 65 to be thrust substantially to the exterior of the cassette shell 3 before the flange 43 needs to be flexed as in FIG. 11. Then, with continued rotation of the spool core 23 in the unwinding direction U, an inclined edge portion 55' of the leader's longitudinal edge 55 starts to locally flex the flange 43 farther apart from the flange 41 to allow the notch 59 to separate from the lip section 51'. Following this, successive longitudinal sections of the film leader 35 exit from between the flanges 41 and 43 to the exterior of the cassette shell 3. See FIG. 11. The flexing of each of the flanges 41 and 43 occurs because the film width WF between the leader's longitudinal edges 53 and 55 is slightly greater than the axial spacing $A_S$ between the annular lips 49 and 51. See FIG. 11. Moreover, successive convolutions of the film roll 33 have a resistance to transverse bowing that is greater than the resistance of the flanges 41 and 43 to be locally flexed. A pair of flat curved bearing members 69 extend from the interior wall 58 of the cassette shell 3 to lie flatly against successive arcuate portions of the two disks 45 and 47 as the flanges 41 and 43 are locally flexed axially away from one another, to thereby assure return of the flexed portions of the flanges to their normal original non-flexed condition. See FIGS. 1 and 2.

A film flattening member 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat as those sections are freed from the flange 41, to facilitate movement of the leading end into the passageway. See FIGS. 6 and 7. The light-trapping plush 31 within the film passageway 25 is elevated along the passageway slightly beyond a longitudinal center line L of the passageway. The film flattening member 71 as shown in FIG. 3 projects almost to the center line L in order to support successive sections of the film leader 35 substantially flat at the center line. See FIGS. 6 and 7. Preferably, a substantially planar film-supporting face 73 of the flattening member 71 is spaced 0.005"–0.030" short of the center line L, and extends widthwise of the film passageway 25 as shown in FIG. 1.

Optionally, a slot 75 is cut in the film leader (outermost convolution) 35 substantially proximate its leading end 37. A tooth 77 fixed to the interior wall 58 of the cassette half 7 has a free pointed end 79 which is positioned to be received in the slot 75 to thus engage the film leader (outermost convolution) 35, when the film spool 5 is rotated in the winding direction W as shown in FIG. 3, and to exit the slot to thus disengage the leader, when the film spool is rotated in the unwinding direction U as shown in FIG. 4. The engagement of the film leader (outermost convolution) 35 and the tooth 77 responsive to rotation of the film spool 5 in the winding direction W prevents the leading end 37 of the leader from coming to rest between the stripper-guide 67 and the next-inward convolution 39.

OPERATION

Figure 6:
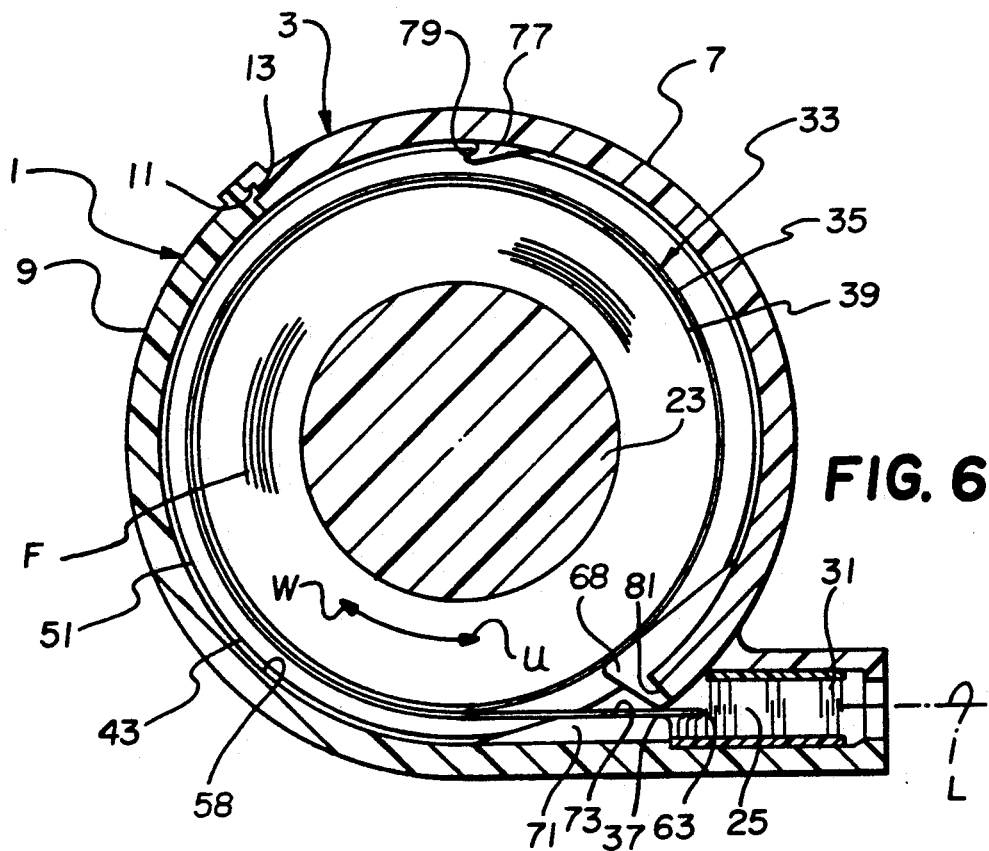
Figure 7:
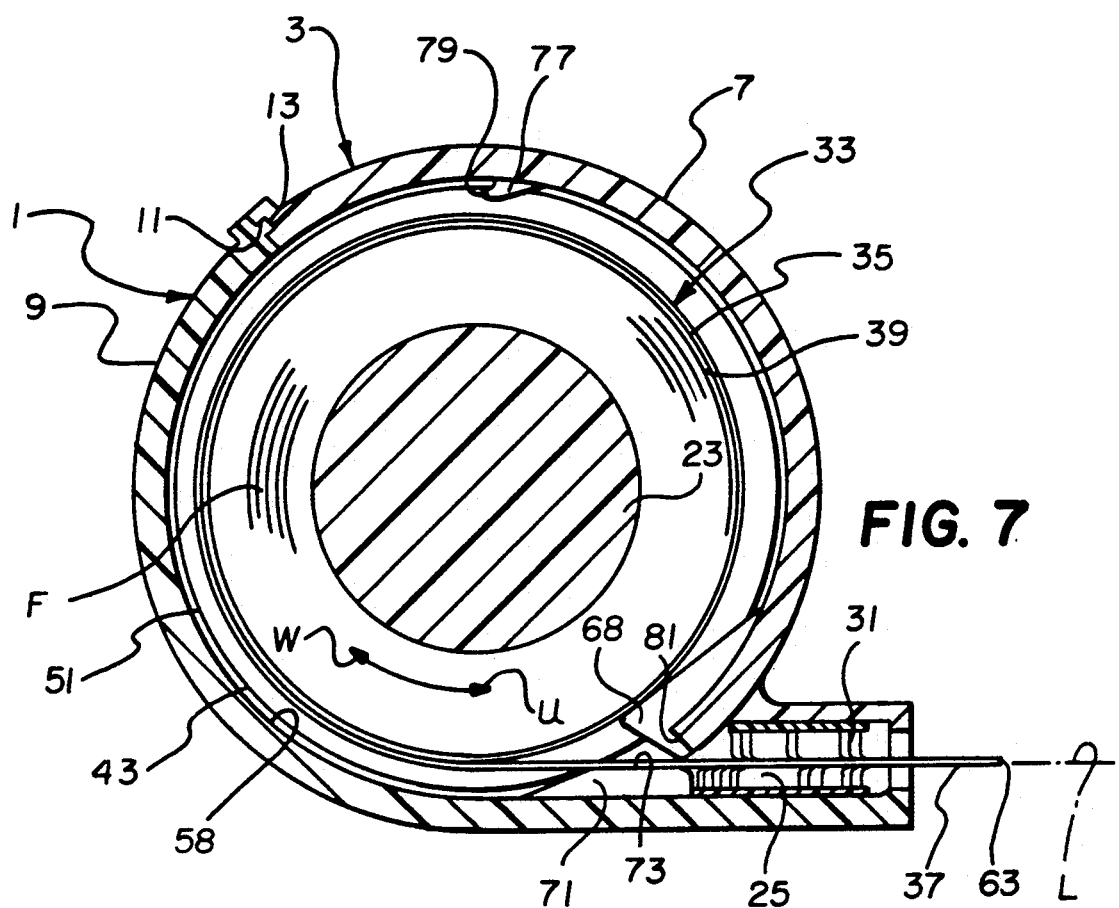
Figure 8:
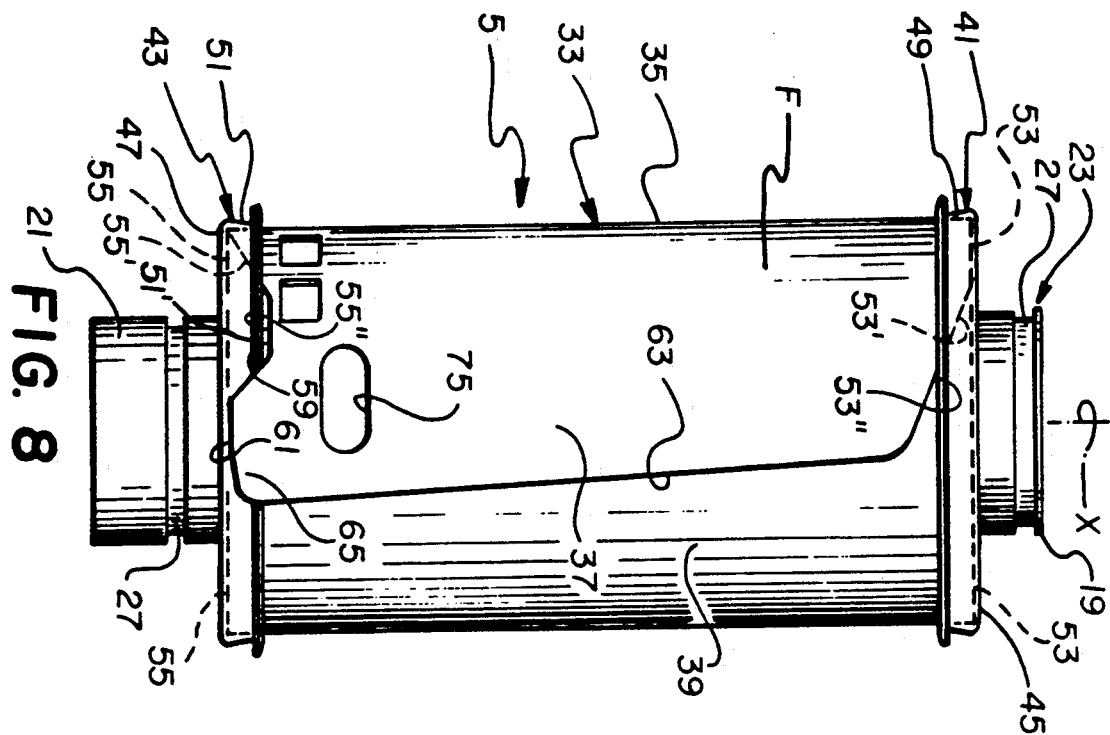
FIGS. 8 and 9 are elevation views of the film roll and the film spool, illustrating the manner in which the film roll is originally stored on the film spool.
Figure 10:
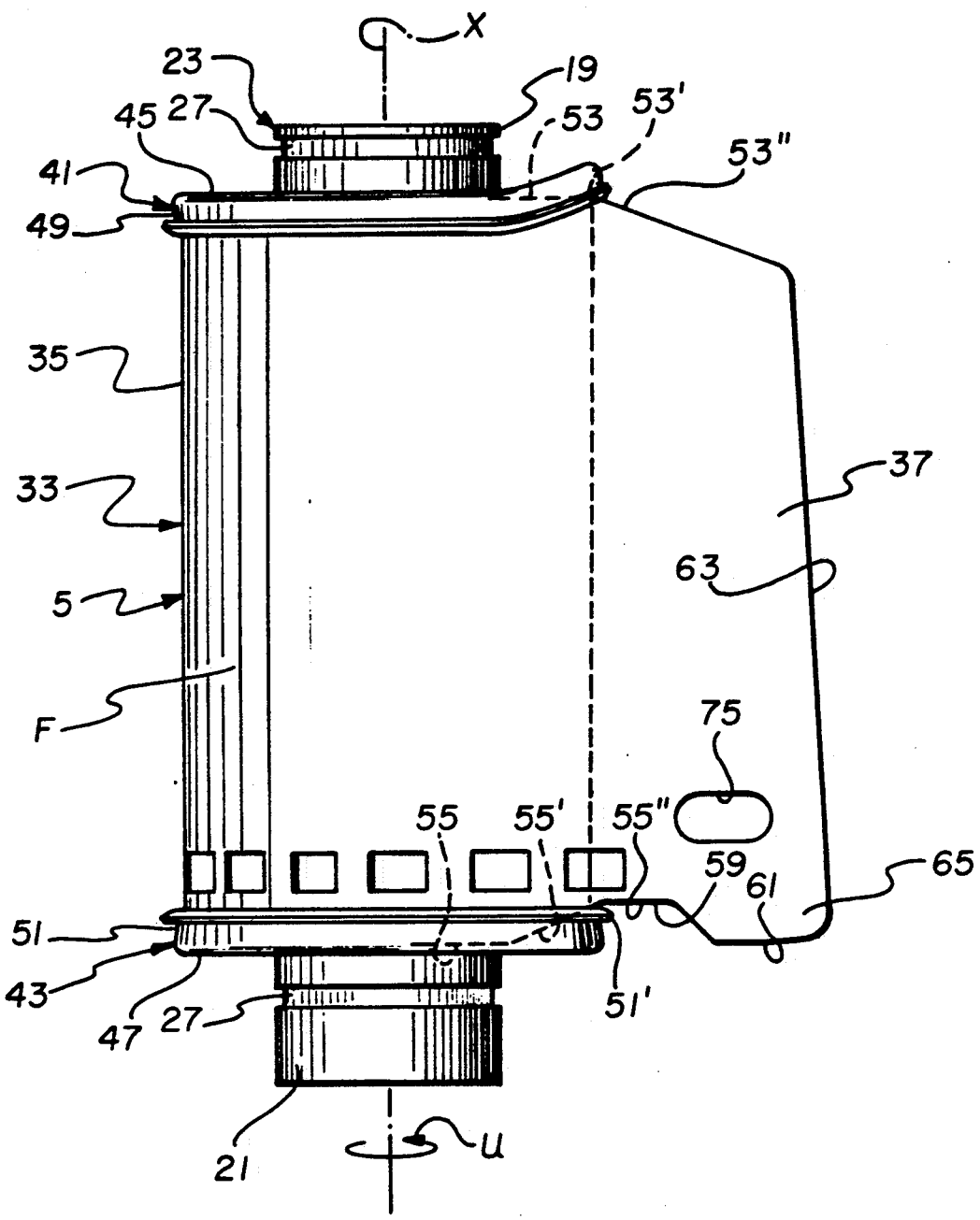
FIGS. 10 and 11 are elevation views similar to FIGS. 8 and 9, illustrating the manner in which the film roll is unwound from the film spool.
Figure 11:
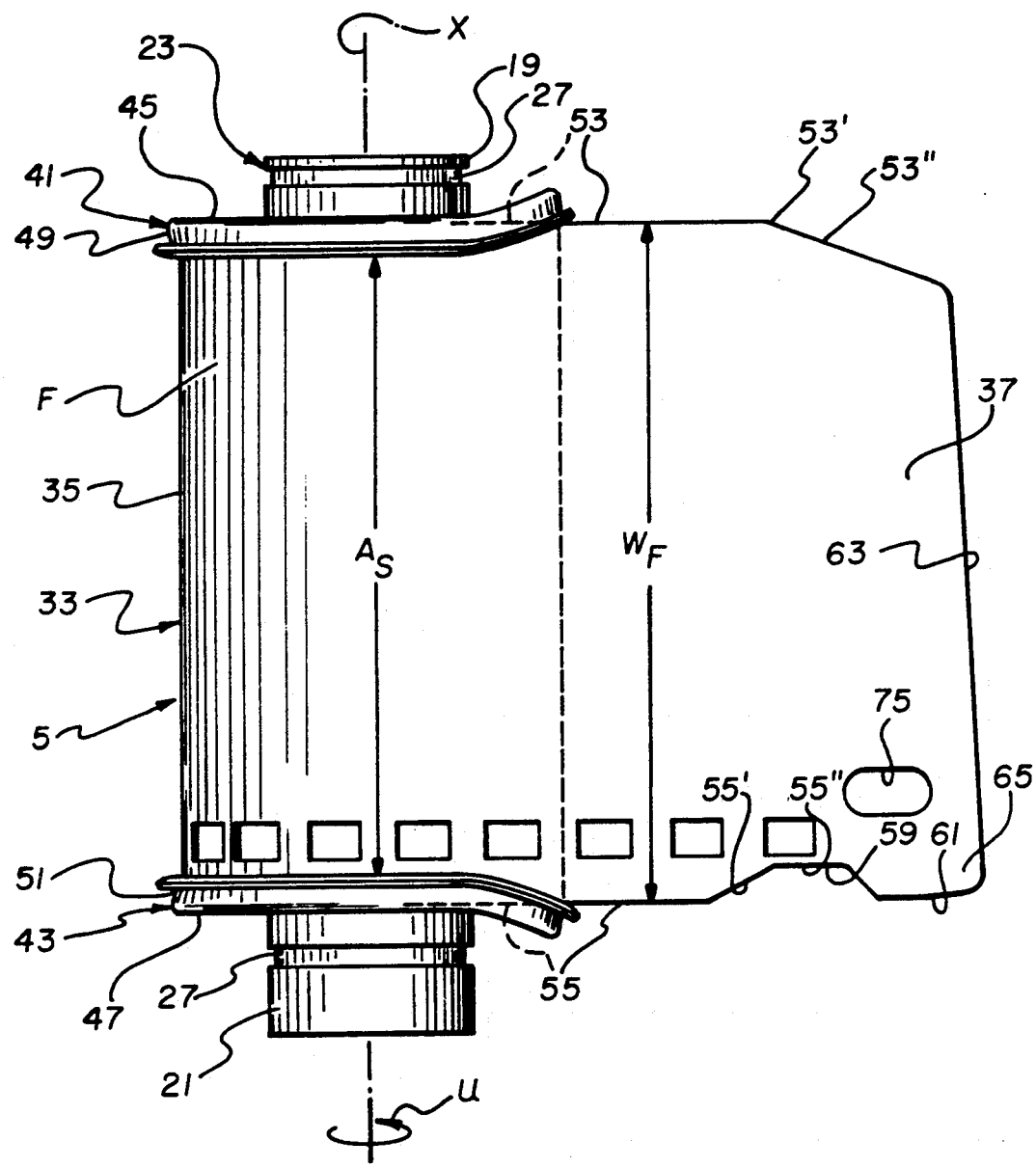

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in commonly assigned U.S. Pat. Nos. 4,834,406 and 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the stripper-guide 68, first causing the leader's inclined edge portion 53 to locally flex the flange 41 and then causing the leader's inclined edge portion 55' to locally flex the flange 43 as shown in FIGS. 10 and 11. This first allows the notch 59 to separate from the lip section 51', and then it allows successive longitudinal sections of the film leader 35 to exit from between the flanges 41 and 43. Since the stripper-guide 68 initially picks up the leading end 37 of the film leader 35 close to its forward-most tip 65, the forward edge 63 of the leading end might initially be supported along a narrow ridge 81 forming one end of the interior wall 58 of the cassette half 7. However, the leading end 37 will tend to back away from the ridge 81 and move against the film-supporting face 73 of the flattening member 71 as shown in FIG. 6.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43. The spool core 23 is rotated in the winding direction W substantially until the slot 75 in the film leader (outermost convolution) 35 receives the free end 79 of the tooth 77 to thus engage the film leader to the tooth. As shown in FIGS. 10 and 11, the film leader 35 has respective edge portions 53" and 55" of its longitudinal edges 53 and 55 that are located one forward of the other, ahead of the inclined edge portions 53' and 55', that are relieved to allow the flange 43 that was flexed last to recover its original shape before the flange 41 that was flexed first can recover its original shape. This serves to ensure that the notch 59 is returned to the lip section 51'.

It has been found that by fixing at least one of the two flanges 41 and 43 to the spool core 23 during unwinding rotation of the film spool 5, as contrasted with allowing the flange to remain rotatable independently of the spool core as in commonly assigned U.S. Pat. Nos. 4,834,306 and 4,848,693, there is immediately effected a frictional relationship between the film leader (outermost convolution) 35 and the skirted periphery of the flange which improves the ability of the film spool to thrust the film leader through the light tight passageway 25 to the exterior of the cassette shell 3. In particular, the frictional relationship increases the pushing force the spool core 23 will apply to the film leader 35 to propel the leader out of the cassette shell 3. Moreover, it has been found that by allowing both of the flanges 41 and 43 to be rotated independently of the spool core 23 during winding rotation of the film spool 5, as in commonly assigned U.S. Pat. Nos. 4,834,306 and 4,848,693, it is substantially ensured that the leader can be rewound within the skirted peripheries 49 and 51 of the flanges without being obstructed by the skirted peripheries.

The invention has been described with reference to a preferred embodiment. However, it will be appreciated that variations and modifications can be effected within the ordinary skill in the art without departing from the scope of the invention. For example, the relieved edge portion 55" of the leader's longitudinal edge 55 could be extended to the leader's forward edge 63. On the other hand, a notch like the notch 59 could be cut in the leader's longitudinal edge 53.

I claim:

1. A film cassette comprising (a) a spool core supported for rotation in a film unwinding direction to thrust a leader section of a film roll coiled about said spool core to the exterior of said cassette and in a film winding direction to return said leader to the exterior of the cassette, and (b) a pair of flanges arranged in spaced relation along said spool core to radially confine the leader and constructed of flexible material to allow them to be flexed apart to permit the leader to readily escape the confinement of the flanges when the spool core is rotated in the unwinding direction, is characterized in that:

said leader has respective edge means for flexing said flanges apart one after the other, rather than simultaneously, when said spool core is rotated in the unwinding direction, whereby said leader can more easily overcome any resistance said flanges may present to movement of the leader outwardly of the flanges.

2. A film cassette comprising (a) a spool core supported for rotation in a film unwinding direction to thrust a leader section of a film roll coiled about said spool core to the exterior of said cassette and in a film winding direction to return said leader to the interior of the cassette, and (b) a pair of flanges arranged in spaced relation along said spool core to overlie opposite longitudinal edges of said leader to radially confine the leader within respective skirted peripheries of said flanges and constructed of flexible material to allow them to be flexed farther apart at said skirted peripheries to permit the leader to readily escape the confinement of the flanges when the spool core is rotated in the unwinding direction, is characterized in that:

said leader has first and second edge means located one forward of the other along the respective longitudinal edges of the leader, normally inwardly of said skirted peripheries, for flexing said flanges farther apart at the skirted peripheries in succession when said spool core is rotated in the unwinding direction, whereby said leader can more easily overcome any resistance said flanges may present to movement of the leader outwardly of said skirted peripheries.

3. A film cassette as recited in claim 2, wherein said leader has a forward edge inclined closer to said first edge means than to said second edge means.

4. A film cassette as recited in claim 2, wherein said leader has an elongate cut-out at the longitudinal edge of the leader that includes said second edge means located opposite said first edge means forward of the second edge means, and the skirted periphery of the flange that the second edge means flexes is normally received in said elongate cut-out to permit a corresponding portion of the leader between the elongate cut-out and the first edge means to be moved outwardly of said skirted periphery before the second edge means flexes the skirted periphery.

5. A film cassette as recited in claim 4, wherein said leader has a forward edge, and said elongate cut-out is sufficiently spaced from said forward edge to allow an intermediate edge portion of the longitudinal edge that includes said second edge means to overlap the skirted periphery normally received in the elongate cut-out outwardly of said skirted periphery.

6. A film cassette as recited in claim 4, wherein said leader has a forward edge, and said elongate cut-out is sufficiently spaced from said forward edge to allow the forward edge to be thrust substantially to the exterior of said cassette before said second edge means flexes the skirted periphery normally received in the elongate cut-out.

7. A film cassette as recited in claim 2, wherein said flanges are sufficiently resilient to recover their original shape, and said leader has respective edge portions of its opposite longitudinal edges located one forward of the other ahead of said first and second edge means which are relieved to allow the flange that is flexed last to recover its original shape initially and the flange that is flexed initially to recover its original shape last when the leader is returned to the interior of said cassette.

8. A film cassette as recited in claim 7, wherein said leader has a forward edge inclined closer to said relieved edge portion located ahead of said first edge means than to said relieved edge portion located ahead of said second edge means.

* * * * *